May 13, 1958 L. E. RAVICH 2,834,891
RADIATION DETECTION METHODS AND DEVICES
Filed March 5, 1954 2 Sheets-Sheet 1
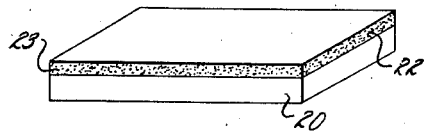
Fig. 1
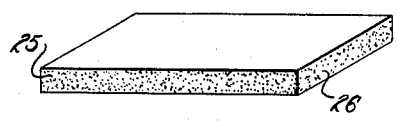
Fig. 2
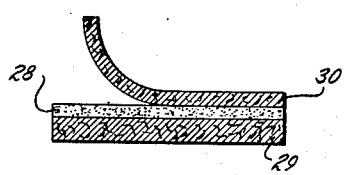
Fig. 3
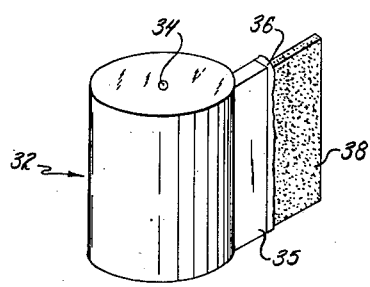
Fig. 4
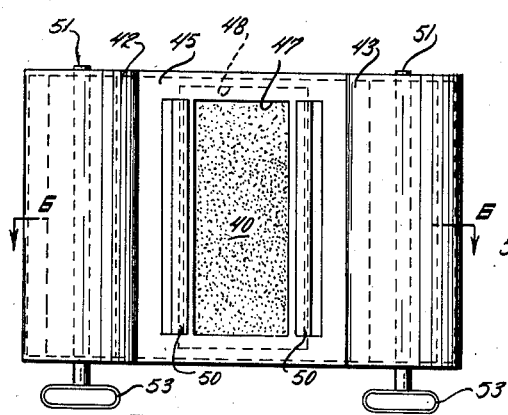
Fig. 5
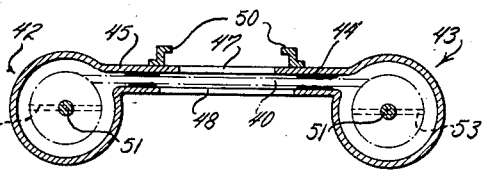
Fig. 6
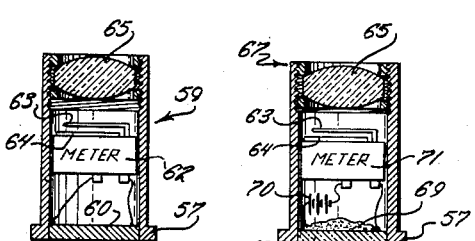
Fig. 8 Fig. 9
Fig. 7
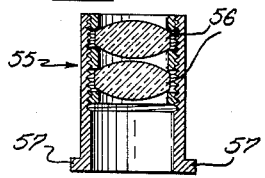
INVENTOR
LEONARD E. RAVICH
BY Strauch, Nolan + Diggins
ATTORNEYS May 13, 1958 L. E. RAVICH 2,834,891
RADIATION DETECTION METHODS AND DEVICES
Filed March 5, 1954 2 Sheets-Sheet 2
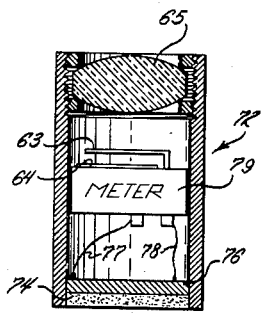
Fig. 10
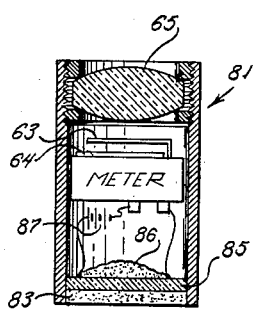
Fig. 11
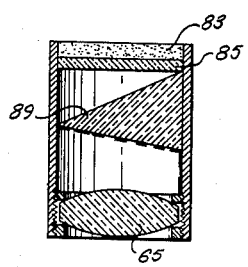
Fig. 12
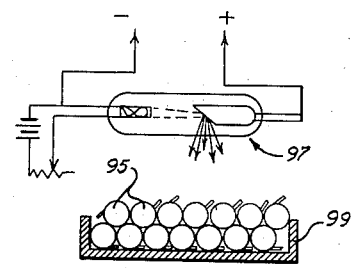
Fig. 15
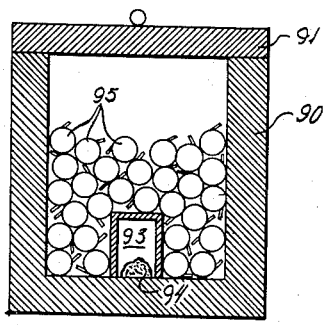
Fig. 14
Fig. 13
INVENTOR
LEONARD E. RAVICH
BY Strauch, Nolan & Diggins
ATTORNEYS

United States Patent Office 2,834,891
Patented May 13, 1958

2,834,891

RADIATION DETECTION METHODS AND DEVICES

Leonard E. Ravich, New York, N. Y., assignor, by mesne assignments, to Hupp Corporation, Cleveland, Ohio, a corporation of Virginia Application March 5, 1954, Serial No. 414,319

19 Claims. (Cl. 250—71)

This invention relates to infra-red detecting devices and more particularly to infra-red counter-detection devices designed for use by military personnel.

During World War II target detection devices utilizing infra-red radiation, for viewing targets which because of darkness or weather conditions were invisible to the eye, came into widespread use. Perhaps the best known of these devices is the "sniperscope," which consists essentially of an infra-red radiant energy emitter aimable in the direction of a target to illuminate it with infra-red, and a viewing device for converting the infra-red reflected back from the target into an image visible to the eye. Since the advent of target detection devices of this type the military has been faced with the problem of finding counter-detection means by which personnel can detect the infra-red radiation emitted by these devices and thus determine whether or not they are under surveillance by them.

This problem is complicated by the exacting requirements which a counter-detection device must meet if it is to be satisfactory for military use. To satisfy these requirements, the device must be rugged yet small in size and light in weight; it must withstand wide extremes of temperature and humidity, be quickly and conveniently useable under field conditions, require a minimum of instruction and supervision in its use, and be sufficiently low in cost to permit wide distribution among those in the field. It is the purpose of this invention to provide counter-detection devices which satisfy these requirements, and methods by which the devices may expeditiously be prepared for field use.

A number of different methods for detecting infra-red radiation have been developed, the simplest of which employ phosphor compounds which by their luminescence give a visual indication of the infra-red radiation incident upon them. Depending on the particular phosphor used, the visual indication given on irradiation with infra-red may be either the extinction of a visible luminescence in the phosphor or the initiation or intensification of visible luminescence. The latter will hereinafter be referred to as "stimulation"; the former as "quenching."

In utilizing the stimulation phenomenon, with which this invention is primarily concerned, the phosphor is first excited by radiation of shorter wavelength than the visible emission band of the material. After most or all of the visible afterglow has died out, the excited phosphor will then emit visible light upon stimulation by infra-red energy. Phosphors may be sensitized to become thus stimulable in accordance with the present invention by including small quantities of activators, such as heavy metals, in the crystal lattice structure of the phosphor. Two different activators, a dominant and an auxiliary activator, are preferably included. The dominant activator determines the quantity and spectral distribution of the emission produced by the phosphor (its emission spectrum); the auxiliary activator largely determines the spectral distribution of sensitivity to radiation (the stimulation spectrum). For visual indication of infra-red the phosphor must have an emission spectrum all or a substantial part of which lies within the visible spectrum, and have a stimulation spectrum extending to the infra-red. Among the phosphors having such emission and stimulation spectra are the double activated strontium sulfide phosphors which include samarium as the auxiliary activator and either cerium, europium or manganese as the dominant activator.

In order for an infra-red stimulable phosphor to be satisfactory for use in counter-detection devices for military use, the following desirable conditions must exist:

(1) The efficiency of conversion of infra-red energy into visible radiation must be high;

(2) The spontaneous emission (background) should be low at the time of use;

(3) The spectrum of the stimulated emission must be favorable for scotopic vision;

(4) High infra-red sensitivity should extend to sufficiently long wavelengths to permit efficient elimination of visible light;

(5) Sufficient energy should be stored to avoid the need for frequent re-excitation;

(6) Adequate excitation should be possible by convenient sources of radiation;

(7) The phosphor must be in a physical form enabling it to be conveniently and quickly used for field detection of infra-red radiation;

(8) The phosphor should be completely stable under varying conditions of moisture and temperature.

The strontium sulfide phosphors named above satisfactorily meet the first four of the requirements listed, but heretofore have failed to meet the last four of these requirements. The decomposition of stimulable phosphors in the presence of moisture has been the most serious deterrent to their use in military counter-detection devices. Further deterrents to their use were the difficulty of maintaining adequate excitation of the phosphors except through expensive and time-consuming operations not adapted to field use, and the powder or granule form of the phosphors which made them inconvenient for field use.

The inventions disclosed herein concern novel methods and means of stimulating such phosphors, and devices employing them dispersed through transparent carrier materials which provide complete moisture protection therefor and facilitate field use thereof. In addition to being moisture-resistant, the devices of this invention present many further advantages, among which are high sensitivity, light weight, low cost, and reliability and convenience of use.

It is accordingly a major object of this invention to provide new and improved infra-red detection devices employing infra-red stimulable phosphors in a manner adapting them to field use.

Another major object of this invention is the provision of novel infra-red counter-detection devices employing an infra-red stimulable phosphor dispersed through a moisture-proof carrier medium transparent to received infra-red and resulting emitted radiation.

Still another important object is to provide novel infra-red detection devices including photometer means providing a quantitative indication of infra-red radiation.

It is also an object of this invention to provide new and improved means and methods of exciting infra-red stimulable phosphors.

A further object is to provide novel methods of continuously exciting infra-red stimulable phosphors by use of an alpha particle emitting radioactive material.

Another object of this invention is the provision of new and improved disposable infra-red detection devices for use by military personnel.

It is also an object to provide novel infra-red stimulable phosphor tapes for infra-red counter-detection purposes.

A further object of this invention is to provide optical devices for both quantitative and qualitative determination of impinging infra-red radiation by phosphor luminescence.

Another object is to provide simple photo-conductive, photovoltaic and extinction type photometers for measuring the luminescence of phosphors upon infra-red stimulation.

These and other objects of this invention will become more fully apparent by reference to the appended claims and the following detailed description when read in conjunction with the accompanying drawings, wherein:

Figure 1 is a diagrammatic representation of a thin, flexible base coated with an infra-red stimulable phosphor in a transparent, moistureproof carrier medium;

Figure 2 is a diagrammatic representation of the inclusion of infra-red stimulable phosphor granules within a transparent, moistureproof, carrier medium film;

Figure 3 is a diagrammatic representation of a method for exposing small portions of a phosphor tape to infra-red radiation while shielding the remainder of the tape;

Figure 4 is a diagrammatic representation of a cartridge for storing and dispensing the phosphor tape;

Figure 5 is a more or less diagrammatic representation of an infra-red exposure device for containing phosphor tape for visual inspection of resulting luminescence or use with an optical viewing device or specially designed photometer;

Figure 6 is a sectional view of the device shown in Figure 5, taken on the line 6—6 in Figure 5;

Figure 7 is a sectional view of an optical viewing device for use with the cartridge of Figure 5;

Figure 8 is a sectional view of a small photometer employing a photovoltaic element for measuring the intensity of luminescence due to infra-red stimulation of a phosphor coated or impregnated material exposed in a device such as shown in Figure 5 or otherwise;

Figure 9 is a photometer employing a photoconductive sensitive unit for measurement of the intensity of luminescence of an infra-red stimulable phosphor tape exposed in a device such as shown in Figure 5 or otherwise;

Figure 10 is a sectional view of an infra-red counter-detection device employing infra-red stimulable phosphors intermixed with a radioactive material emitting alpha particles and in combination with a photovoltaic element;

Figure 11 is a sectional view of an infra-red counter-detection device employing infra-red stimulable phosphors intermixed with a radioactive material emitting alpha particles and in combination with a photoconductive element;

Figure 12 is a sectional view of an optical device for measuring the emission from a phosphor upon infra-red stimulation by means of an extinction type photometer;

Figure 13 is an elevational view of the extinction wedge used in the photometer of Figure 12.

Figure 14 is a diagrammatic representation of a method for activating a batch of cartridges containing phosphor tapes with alpha radiation; and Figure 15 is a diagrammatic representation of a method for activating a batch of cartridges containing phophor tapes by X-radiation.

With continued reference to the drawings wherein like reference numerals are used throughout to indicate like parts, Figure 1 shows a short strip of a phosphor tape prepared in accordance with this invention. The phosphor tape consists of a backing layer 20 provided with a coating 22 of a solid carrier medium through which particles 23 of an infra-red stimulable phosphor are dispersed.

Backing layer 20 may be of any material to which the phosphor carrier medium will adhere, but is preferable relatively thin, flexible and light in weight. Materials I have found satisfactory include paper, both coated and uncoated, and films such as cellophane, cellulose acetate, vinyl resins, metal foil, etc. Other suitable materials will suggest themselves to those skilled in the art, and any may be used except as the requirements of the specific application may dictate the selection of a particular material.

The carrier medium through which the phosphor is dispersed must in order to protect the phosphor be substantially impervious to moisture and, where it is to be coated on a backing layer as in Figure 1, must be capable of adhering securely to the backing material. It must also be transparent to radiation of visible, infra-red and excitation wavelengths, and should neither chemically react with the phosphor nor act to quench its luminescence. Examples of materials which satisfy these requirements are lacquer bases, wax solutions or emulsions and vinyl alcohol solutions. The carrier medium and/or the backing material may have agents for imparting mold, fungus, insect or rodent resistance added thereto, if conditions of use make these additives necessary to preservation of the tape.

The phosphor is preferably the samarium-cerium activated strontium sulfide described above, but other phosphors, such as samarium-europium activated strontium sulfide and samarium-manganese activated strontium sulfide, may also be used.

Either alpha radiation, X-radiation or ultra-violet radiation may be used for excitation of the phosphor, the excitation peaks in the case of the samarium-cerium activated strontium sulfide being at 0.29 and 0.35 micron. A convenient method for exciting the phosphor is to expose it to day-light for a few minutes, preferably through an ultra-violet filter. Other excitation methods, including excitation by X-ray and alpha particle radiation, will be discussed hereinafter.

The efficiency of the samarium-cerium strontium sulfide phosphor approaches approximately 1%, with an infra-red stimulation peak at approximately 1.02 microns and a visible light emission peak at approximately 0.485 micron. It is to be noted that this emission peak lies within the green portion of the visible spectrum and therefore is easily detected by the dark adapted eye (scotopic vision). Samarium-cerium activated strontium sulfide has a sensitivity such that the radiation from an incandescent lamp of 2800° K. color temperature equipped with a good infra-red filter produces on the phosphor approximately one-tenth of the brightness which it produces without any filter when it strikes a perfectly diffused white screen (this being valid for scotopic vision). When stored in the dark it will keep its sensitivity almost unchanged for several days. The energy storage capacity of this phosphor is indicated by its ability to produce, when stimulated by infra-red, a brightness of 1 microlambert for several hours before its senstivity drops, because of loss of excitation, to one-half the initial sensitivity. The visible light output follows the infra-red stimulation over a wide intensity range with time lags of the order of a millisecond.

When dispersed through a transparent carrier medium of the type described above, the phosphor is completely protected from moisture yet may be easily observed and readily subjected to infra-red and excitation radiation.

Figure 2 shows an alternative form of the invention in which the phosphor tape includes no backing layer. The phosphor particles 25 are dispersed through a film 26 of carrier material of sufficient thickness and strength to be self-supporting, so that the backing layer of Figure 1 may for some applications be dispensed with. The carrier material should be transparent to visible, infra-red and excitation radiation, and should neither chemically react with the phosphor nor act to quench its luminescence. Exemplary of carrier materials which satisfy these requirements are cellophane, cellulose acetate or mixed esters, vinyl resin sheeting, etc. The inclusion of the phosphor within such a transparent film offers the advantage of permitting observation of the phosphor luminescence from either or both sides of the film, and also provides a high degree of moisture protection for the phosphor.

Figure 3 illustrates how small portions of the phosphor tapes of Figures 1 and 2 may be exposed to incident infra-red radiation while other portions of the tape remain shielded from the radiation. The tape 28 is initially covered on both sides with strips of material substantially opaque to infra-red, the strip covering one side being readily removable to expose the tape. If the tape to be used is of the type shown in Figure 1 the backing layer may itself serve to shield one side of the tape from infra-red radiation; if the tape of Figure 2 is to be used it must be covered on one side with shielding material such as shown at 29 in Figure 3. In either case, the other, unshielded side of the tape is covered with an easily removable strip 30 of masking material held in position on the tape by an adhesive compound which will permit removal of the masking strip without affecting or causing removal of the phosphor coating or film. Masking strip 30 should be made of a material known to have infra-red filtering qualities such as asbestos paper or a multicellular type of paper such as highly absorbent, flexible blotting paper, etc.

In use, the phosphor tape is exposed to ultra-violet radiation and the adhesive coated masking strip is then applied in the dark directly to the excited phosphor surface. The finished tape may then be cut into small sections or rolled. When the user wishes to determine whether or not he is being surveyed with infra-red radiation, he merely peels back some of the masking strip and the phosphor will then be stimulated, if infra-red energy is present, and emit a visible luminescence. The portions of the tape still unexposed may be used at a later time simply by removing the masking strip still adhering to the unexposed portions of the tape. The phosphor may also be excited after the application of the adhesive masking strip by exposure to a source of alpha radiation for a few minutes.

Figure 4 shows a simple cartridge 32 for dispensing the phosphor coated tape of Figure 1 or phosphor film of Figure 2. This cartridge should be constructed of a material substantially opaque to infra-red radiation such for example as aluminum. The tape or film is wound around a spindle 34 mounted inside cartridge 32. An exit slot section 35 is provided with a black velvet lining 36 in such manner that no radiation can impinge on the phosphor tape within the cartridge. The phosphor coated tape or film 38 may be pulled out as needed. The presence of infra-red radiation will stimulate the coating to luminescence which can be viewed by the user. The exposed tape can then be torn off and disposed of as desired.

Figures 5 and 6 show a form of tape exposure device. The tape 40 is stored in cylinder 42 and passes from cylinder 42 to cylinder 43 through a hollow guide member 45 joining cylinders 42 and 43 which may be lined with black velvet at 44. Guide member 45 has formed therein upper and lower windows 47 and 48, respectively, through which the tape may be exposed and viewed. A viewing device, such as one of those described in Figures 6, 7 and 8 below, slides onto the device and is held securely thereon by mounting flanges 50 fixed to guide member 45 on either side of its upper window 47. A portion of infra-red transparent tape may be exposed to infra-red radiation through the lower window 48, and its luminescence may be viewed through upper window 47 or measured by the devices described hereinbelow. A transparent tape base or an extruded film containing the phosphor granules is preferred for this device because infra-red radiation impinges on one side of the tape and the luminescence is viewed or measured from the other side thereof. The tape may be wound about spindles 51 mounted inside cylinders 42 and 43, the spindles being pivoted with handles 53 to facilitate rotation thereof for transferring the tape from cylinder to cylinder. The cylinders 42 and 43 and guide member 45 may be constructed of an infra-red opaque material such as mentioned above in reference to the cartridge of Figure 4.

Figure 7 shows a small viewing device 55 containing magnifying lenses 56. This device is attached to the cartridge illustrated in Figures 5 and 6 by means of ridges 57 which slidingly engage under mounting flanges 50 (Figures 5 and 6) to position the viewing device directly over window 47. Lenses 56 provide a magnified view of the phosphor and thus facilitate observation of the luminescence thereof.

Figure 8 shows a miniature photometer device 59 for use in conjunction with the device shown in Figures 5 and 6. The tape section exposed through window 47, Figure 5, will be directly under the photovoltaic element indicated at 60 in Figure 8, which element may be of selenium or other photovoltaic material. The infra-red radiation will stimulate the phosphor tape to luminescence, which will generate a small voltage in the photovoltaic unit 60. This voltage will actuate meter 62, which may be of any conventional type, causing a deflection of its pointer 63 across scale 64. The pointer and scale should both be coated with luminous dial paint of a type permitting observation of the pointer and scale in the dark. A magnifying lens 65 may be provided to facilitate observation of pointer movement. A device of this type will provide a quantitative measurement of impinging infra-red radiation.

Figure 9 shows a photoconductive photometer 67 for measuring the emission energy of a phosphor coated tape or phosphor film exposed through window 47 in the device of Figure 5. The luminescence radiation from the phosphor passes through transparent plate 68 and impinges on the photoconductive cell 69, permitting passage of current from battery 70 through a meter 71. This will cause a deflection of pointer 63 across scale 64, which deflection may be viewed through magnifying lens 65. The photoconductive element may be of any photoconductive material such as cadmium sulfide, and the battery may be a mercury button type or other small battery. The sensitivity of the unit will be higher than that obtainable with the photovoltaic device of Figure 8.

Figure 10 illustrates a miniature infra-red detection device 72 utilizing a screen 74 containing an infra-red stimulable phosphor in combination with a small amount of radioactive material which will provide a source of alpha particles, the phosphor and radioactive material being dispersed through a solid infra-red transparent carrier medium such as described above. The alpha radiation will cause a continuous excitation of the phosphor in screen 74 and, even in the absence of infra-red radiation, will also cause some luminescence of the phosphor. This relatively dim background luminescence will impinge on a photovoltaic element 76, such as selenium, causing it to generate a small "dark" current which will flow through leads 77 and 78 to meter 79. As a result of this small "dark" current a small deflection of pointer 63 over scale 64 will occur which can be viewed through lens 65. When infra-red energy impinges on the excited phosphor layer 74 it will stimulate the phosphor to much brighter luminescence and cause a correspondingly greater amount of current generation within the photovoltaic cell 76, with an accompanying large deflection of pointer 63 over scale 64. The zero marking on the scale is placed at the point of maximum background luminescence of the phosphor due to impingement of alpha radiation thereon. Thus the measurement of pointer deflection due to the infra-red radiation can be read directly. This device is particularly satisfactory for counter-detection purposes because it can be made extremely small and yet be ready for immediate use without re-excitation after each infra-red exposure.

Figure 11 illustrates a similar infra-red detection device 81 employing an alpha radiation excited phosphor coating 83 on glass plate 85 in contact with a photoconductive element 86 of a material such as cadmium sulfide. The mechanism of operation is the same as that discussed for Figure 10 above, except that the change in resistance of photoconductive element 86 will allow a passage of current from battery 87 through the photoconductive element and to the meter, thereby causing a deflection of pointer 63 across scale 64 which may be viewed through lens 65.

Figures 12 and 13 illustrate a very simple device for quantitative measurements of impinging infra-red radiation. A phosphor coating 83 on a glass plate 85 contains an alpha particle emitting material for continuously exciting the phosphor, the luminescence of which may be viewed through magnifying lens 65. Between the excited phosphor coating and the lens 65 is interposed a colored glass wedge 89. The degree of opacity at any point on the glass wedge is determined by its thickness at that point. Consecutive numbers are printed on the face of wedge 89 as shown in Figure 13. The amount of phosphor luminescence caused by infra-red stimulation can be measured by the numbers visible on the wedge surface. For example, with a small amount of luminescence only numbers 1 and 2 may be visible because the wedge is thin at this point. With more luminescence, numbers 4, 5, 6, 7 etc., would become visible because the brighter luminescence would penetrate the wedge at its thicker points.

Figure 14 illustrates a method for activating a batch of phosphor tape filled devices of the type shown in Figure 4 or of the type shown in Figure 5. A lead container 90 with a lead cover 91 has an internal chamber 93 containing an alpha particle emitting radioactive material 94. Cylinders containing the phosphor tape, to be excited for subsequent infra-red stimulation, are placed in the chamber as shown at 95. The alpha radiation from the radioactive material 94 will penetrate the cylinders and excite the phosphor in or on the tape so that it may be stimulated upon exposure to infra-red radiation.

Figure 15 illustrates another method for exciting phosphor tapes stored in cylinders. X-radiation from X-ray tube 97 penetrates the cylinders 95 in lead tray 99 and excites the phosphor tapes within the cylinders for subsequent infra-red stimulation.

In still another method for exciting the phosphor tapes an alpha particle emitting radioactive material is dispersed through the phosphor carrier medium, as described above with reference to Figures 10–12. This method provides continuous excitation of the phosphor and thus is of particular advantage for field use where the time and equipment necessary for periodic re-excitation are not readily available.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An infra-red counter-detection device for field use comprising a phosphor which after excitation is stimulable to visible luminescence by exposure to infra-red radiation, said phosphor being dispersed through a solid carrier material impervious to moisture and transparent to visible, infra-red and excitation radiation, and envelope means substantially opaque to infra-red enclosing said phosphor bearing carrier material and having an opening through which said material may be passed for exposure to incident radiation.

2. The counter-detection device defined in claim 1 wherein said infra-red stimulable phosphor is a strontium sulfide phosphor sensitized by inclusion of dominant and auxiliary activators, said auxiliary activator being samarium and said dominant activator being selected from the group consisting of europium, cerium and manganese.

3. The counter-detection device defined in claim 1 wherein said carrier material has dispersed therethrough in admixture with said phosphor a radioactive material characterized by alpha particle emission, to provide continuous excitation of said phosphor.

4. An infra-red detector for field use including a phosphor tape adapted to indicate the presence of infra-red radiation by visible luminescence comprising a strip of carrier material substantially impervious to moisture and transparent to both visible and infra-red radiation, and a phosphor compound which after excitation is stimulable to visible luminescence by exposure to infra-red radiation, said phosphor being in particle form and dispersed through said carrier material, and envelope means fabricated of material substantially opaque to infra-red enclosing said phosphor tape and having an opening through which said tape may be passed for exposure to incident radiation.

5. The infra-red detector defined in claim 4 wherein said unit includes two chambers between which said phosphor tape may be passed for exposure to incident radiation.

6. The infra-red detector defined in claim 4 wherein said unit has detachably mounted thereon a viewing device for magnifying and thus providing better observation of said tape as it is exposed by said unit.

7. The infra-red detector defined in claim 4 wherein said unit has detachably mounted thereon means providing a photometric indication of the luminescence of the tape exposed by said unit.

8. The infra-red detector defined in claim 7 wherein said photometric means comprises a photovoltaic cell positioned to be irradiated by luminescence of the tape exposed by said unit, and means responsive to voltage output of said photovoltaic cell to give a quantitative indication of tape luminescence.

9. The infra-red detector defined in claim 7 wherein said photometric means comprises a photoconductive cell positioned to be irradiated by luminescence of the tape exposed by said unit, means imposing a voltage across said photoconductive cell, and means responsive to current through said cell to give a quantitative indication of tape luminescence.

10. An infra-red detection device comprising a phosphor which after excitation is stimulable to fluorescence by exposure to infra-red radiation, said phosphor being dispersed through a solid carrier material impervious to moisture and transparent to infra-red excitation radiation, and photometer means irradiated by said phosphor and operative to provide a quantitive indication of the fluorescence thereof, and means mounting said phosphor bearing carrier material to said photometer means to form a unitary assembly adapted to field use.

11. The detection device defined in claim 10 wherein said photometer means includes a photovoltaic cell having its sensitive element positioned in close proximity to said carrier material.

12. The detection device defined in claim 10 wherein said photometer means includes a photoconductive cell having its sensitive element positioned closely adjacent said carrier material.

13. The detection device defined in claim 10 wherein said photometer means comprises a wedge-shaped body of a material having limited transparency to the radiation emitted by said phosphor.

14. The detection device defined in claim 10 wherein said carrier material has dispersed therethrough a radioactive material characterized by alpha particle emission to provide continuous excitation of said phosphor.

15. The method of preparing infra-red detection devices for field use comprising the steps of providing a transparent tape having dispersed therethrough a phosphor compound which after exposure to excitation radiation is stimulable to visible luminescence by exposure to infra-red, mounting said tape in a device opaque to infra-red and transparent to excitation radiation and closed but for a slot through which said tape may be withdrawn and exciting the phosphor tape within said device by exposing said device to a source of excitation radiation located exteriorly of said device.

16. The method defined in claim 15 wherein the exciting radiation is the alpha particle emission of a radioactive material placed closely adjacent the exterior of said device.

17. The method defined in claim 15 wherein the exciting radiation is produced by an X-ray emitter positioned to direct its emitted radiation against said device.

18. An infra-red detection device comprising an open-ended housing enclosing photometer means providing a photometric indication visible through one open end of said housing of luminous intensity at the other open end thereof, and means mounting to said other housing end a body of transparent carrier material having dispersed therethrough a phosphor which after excitation is stimulable to luminescence by exposure to infra-red radiation, whereby infra-red incident on said phosphor bearing carrier material may cause luminescence therein the intensity of which is indicated by said photometer means.

19. The detection device defined in claim 24 wherein said phosphor bearing carrier material is in tape form and enclosed within cartridge means adapted to be secured to said housing, said cartridge means having a first opening therein through which said tape may be exposed to incident radiation and a second opening through which tape luminescence may be measured by said photometer means.

References Cited in the file of this patent

UNITED STATES PATENTS

| | | |
|---|---|---|
| 2,319,222 | Ferris | May 18, 1943 |
| 2,333,641 | Corwin | Nov. 9, 1943 |
| 2,341,583 | Tuve | Feb. 15, 1944 |
| 2,551,650 | Urbach | May 8, 1951 |
| 2,642,538 | Urbach | June 16, 1953 |

OTHER REFERENCES

"On Infra-Red Sensitive Phosphers," Urbach et al., Journal of the Opt. Soc. of America, vol. 36, #7, July 1946, pp. 372–381.